G. W. BULLEY.
BRIDGE FOR INNER TUBES.
APPLICATION FILED FEB. 18, 1918.
1,385,774.
Patented July 26, 1921.
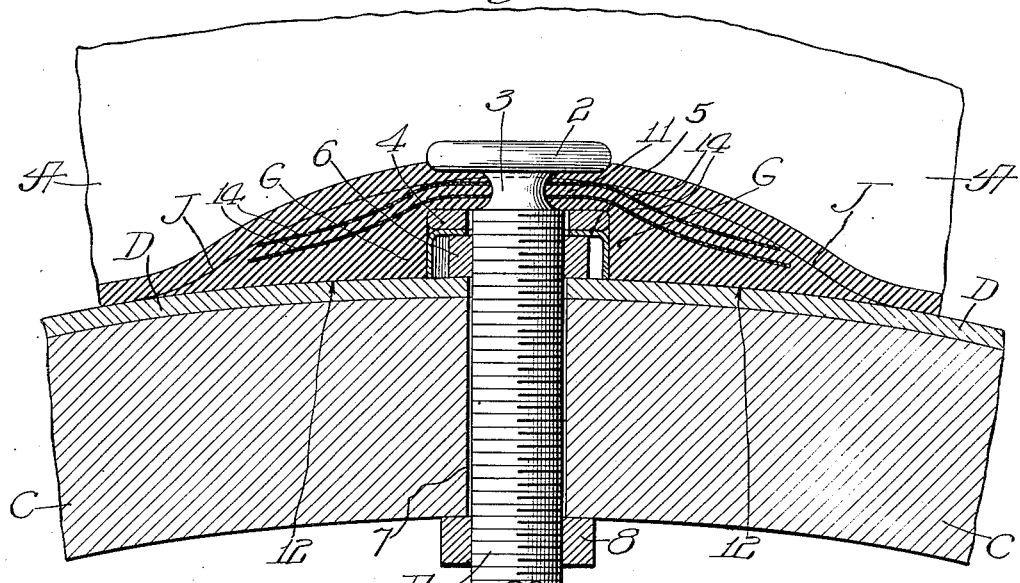
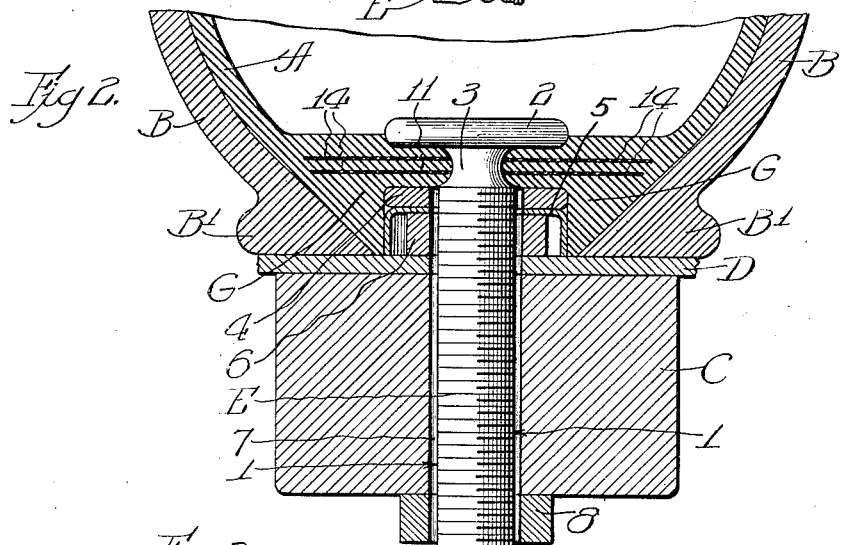
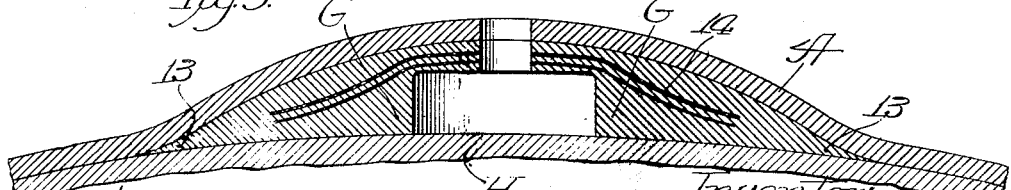
Inventor:
George W. Bulley

UNITED STATES PATENT OFFICE.

GEORGE W. BULLEY, OF ST. JOSEPH, MICHIGAN.

BRIDGE FOR INNER TUBES.

1,385,774. Specification of Letters Patent. Patented July 26, 1921.

Application filed February 18, 1918. Serial No. 217,767.

*To all whom it may concern:*

Be it known that I, GEORGE W. BULLEY, a citizen of the United States of America, and resident of St. Joseph, Berrien county, Michigan, have invented a certain new and useful Improvement in Bridges for Inner Tubes, of which the following is a specification.

My invention relates to improvements in automobile tires, and particularly to the method of mounting the valves in inner tubes.

The inner tubes of the usual automobile tire are provided with valves through which air for inflation of said tires is admitted. The stems of the valves are projected through the felly of the wheel and secured at one end to the inner tube. It is the general practice to clamp the wall of the inner tube between two flat disk members, one of which forms a head integral with the stem and the other being loose on the stem. A jam nut on the stem is used for applying clamping pressure on the disks. A metal bridge is used to support the inner tube above the jam nut and prevent its being forced by the air pressure in the tube against the sharp corners of the nut. This bridge member is positioned between the loose disk and the jam nut, and like the disk, is loosely mounted on the valve stem. Its ends are curved so as to bear upon the wheel rim. The valve stem is clamped against the inner periphery of the wheel for the purpose of drawing the bridge member against the wheel rim to secure the valve stem to the wheel. Since both the bridge and the clamping disk are loose on the stem, however, this drawing or clamping strain is actually carried to the integral disk on the stem and results in compressing the wall of the inner tube and destroying the clamping pressure between the head and the jam nut. Another objection to this structure lies in the fact that the rubber of the inner tube is distorted out of its natural position by the bridge, resulting in its becoming set and weakened.

It is the purpose of my invention to provide a structure which will eliminate these objections, and which will relieve the rubber of the inner tube of the strains and distortion incident to the mounting of the valve in the tube and wheel and to the maintenance and operation thereof.

Referring to the accompanying drawings—

Figure 1 is a circumferential section of a portion of a tire and valve structure embodying my invention.

Fig. 2 is a section through the valve center at right angles to that shown in Fig. 1.

Fig. 3 is a section similar to that shown in Fig. 1, except that it shows my improved bridge in position while in the mold.

In the drawings, A represents a portion of a rubber inner tube of the usual type in position within an outer casing B on the wheel C. The wheel felly C has a steel rim D of usual construction on its periphery. When the tube is in position and inflated within the casing, its inner periphery usually lies against the felly rim in the space between the beads $B^1$ of the outer casing, except at that portion adjacent the valve stem E. The valve stem E is of standard construction and comprises a hollow tubular member threaded exteriorly for its entire length and flattened on two opposite sides 1. This stem has on its inner end a flat disk-like integral head 2 of larger diameter than the stem. The head is positioned within the tube A and forms one clamping member of the unit against which the inner surface of the tube is clamped. The stem has a neck portion 3 of smaller diameter adjacent the head which permits the rubber of the tube to hug the stem very snugly. The other clamping member 4 is formed by a similar flat washer or disk which is forced against the outer surface of the tube by means of a jam-nut 6 threaded on the stem. The clamping member 4 is loose on the stem so that it may be forced against the yielding wall of the tube without being rotated, a feature which is quite esential to the formation of a tight joint. In the present structure, I provide a cup washer or inclosure 5 for the jam-nut. This is also loose on the steam and is interposed between the clamping member and the jam-nut. One purpose of this cup is to provide a definite space for a tool to grip the jam-nut. The clamping pressure exerted by these clamps can be regulated as desired by the nut, and, as is generally understood, having once been set, it ought not to be disturbed.

The stem extends through a suitable radial hole 7 in the rim and wheel felly, and on its outer end portion the stem has a nut 8 which bears against the felly and draws the jam nut against the steel rim. In this manner the stem is rigidly secured to the wheel felly so as to prevent the stem from being moved to distort the rubber of the tube. It will be observed, however, that the clamping pressure exerted on the tube wall by the clamping member is not disturbed or effected in any way by clamping the felly between the jam-nut and the nut 8, because the jam-nut is threaded on the stem and acts as a fixed collar or shoulder thereon.

In pursuance of my invention, I eliminate the usual metal bridge entirely, so that the jam-nut can always be drawn against the wheel rim without effecting the clamping pressure on the tube. However, since the jam-nut occupies some space beyond the periphery of the rim, the portion 11 of the tube wall which is clamped between the clamping disks necessarily is offset with respect to the circular line of the inner periphery of the tube. Because of the fact that in the standard valve construction this offset portion is necessary, I construct the tube with an offset to conform to requirements of the valve structure. However, I mold or form the tube initially with this offset. This is done at the time when the tube is being molded and cured and may be accomplished in any suitable or approved manner. I prefer, however, to form the offset during the molding and vulcanization of the tube, by means of a member which is independent of the mold but which remains with the tube as a part of the molded and cured unit. In order to carry out my invention, I provide a block or mass G of rubber which has been previously given the proper shape for the purpose. In cross section the mass is curved to conform to the cross-section of the portion of the tube which it replaces, while in a circumferential direction the side or surface 12 is arcuated to correspond to the circle of the inner periphery of the tube. The other surface 13 is tapered or rounded off to thin ends so as to avoid any sharp bends, as shown in the drawings. In the central portion of the block G, a hole is provided for the valve stem, this hole being of such size that the rubber fits the stem snugly. This opening is enlarged to accommodate the cup 5 hereinbefore mentioned.

In practice, I assemble the valve structure and tube and mass or block of rubber G and place the entire assembled structure in the mold and form the wall of the tube to fit the block G while the rubber is in its uncured or partially uncured state. While in this state, the rubber is capable of being manipulated without straining or distorting it. Having thus arranged the parts, the curing or vulcanizing process may be commenced and completed, and the assembled structure removed from the mold, the block or mass forming a part of the unit. The rubber in the block is preferably harder and less yielding or resilient than the rubber in the tube itself, although not sufficiently hard as to be brittle. However, the degree of hardness of the block is necessarily dependent upon the particular type of tube and the purposes for which it is intended. By coating the block with soapstone, for instance, it may be maintained separate from the tube, but on the other hand if the block is placed in the mold in an uncured state with the tube and both vulcanized at the same time. In this way the block and tube can be made an integral structure. I also embed several layers of fabric 14 in the mass G of rubber to further strengthen it around the valve stem hole.

It will thus be observed that the block or mass G thus performs all of the functions of a bridge member. When the tube is inflated in service, the internal pressure cannot distort or otherwise affect the tube wall because it is maintained in its normal position by the bridge block. The bridge block rests for the entire length upon the wheel rim and supports the tube properly around the valve stem. Furthermore, even if the stem hole 7 should happen to be large enough to admit the jam-nut 6 and cause the edge of the cup 5 to take the strain, the resiliency of the bridge block G would prevent damage to the structure.

What I claim as my invention is:

1. The combination of a wheel rim, a tire outer casing, an inner tube within the casing with its inner periphery bearing upon said rim, and having an indented portion in said inner periphery, a valve stem extending through said indented portion and extending through said wheel rim, a nut on said stem for fastening it to said indented portion, a mass of rubber filling the space between said indented portion and the wheel rim, forming a bridge for supporting said indented portion adjacent the valve stem, and having a central recess surrounding said valve stem, and a cup member fitted in said recess and inclosing said nut.

2. The combination of an annular rubber inner tube having an indented portion in its inner periphery, a valve stem having a head within said tube and a nut outside of said tube for clamping the indented wall portion against said head, a circular cup member on the stem interposed between the nut and tube wall and arranged with its wall extending to surround the nut, and a block of rubber filling said indented portion to form a supporting bridge for the indented portion, and having a circular recess into which said cup is fitted.

Signed by me at Chicago, Illinois, this 21st day of January, 1918.

GEORGE W. BULLEY.